Patented Sept. 14, 1954

2,689,233

UNITED STATES PATENT OFFICE 2,689,233

RESINS FROM CYCLOPENTADIENE, GLYCERIDE OIL, STYRENE, AND ALPHA METHYL STYRENE

Wallace K. Hoya, Milwaukee, Wis., assignor to Pittsburgh Plate Glass Company, Allegheny County, Pa., a corporation of Pennsylvania No Drawing. Application May 3, 1952,
Serial No. 286,009

11 Claims. (Cl. 260—23.7)

The present invention relates to the preparation of synthetic resins which include copolymers of cyclic diene hydrocarbons such as cyclopentadiene and unsaturated glyceride oils such as linseed oil or soya bean oil and it has particular relation to the preparation of copolymer resins of the foregoing type which include as a component styrene or styrene like material.

One object of the invention is to provide a coating composition having air-drying characteristics similar to those of tung oil from comparatively common and inexpensive materials.

A second object of the invention is to provide a coating composition comprising a copolymer of cyclopentadiene and a drying oil which is of high gloss and depth.

A third object of the invention is to prepare a coating composition which is of relatively high viscosity at a given solids content from cyclopentadiene and a glyceride oil.

A fourth object of the invention is to provide a coating composition from glyceride oil and cyclopentadiene which is of higher flexibility than those heretofore available.

A fifth object of the invention is to provide a coating composition from cyclopentadiene which is of superior durability and resistance to weathering.

These and other objects of the invention will be apparent from consideration of the following specification and the appended claims.

It has heretofore been proposed to prepare synthetic resins and coating compositions by conjointly polymerizing a glyceride oil, notably an unsaturated or drying glyceride oil such as linseed oil or soya bean oil and a cyclic diene hydrocarbon such as cyclopentadiene or the lower homopolymers thereof, e. g. dicyclopentadiene or tricyclopentadiene. The conventional products were most conveniently prepared by heating, in the absence of catalysts, a mixture of the oil and the hydrocarbon, e. g. dicyclopentadiene in a pressure container such as an autoclave.

By application of such methods it was possible to obtain copolymers which were either liquid or solid, dependent upon the amount of the hydrocarbon present in the reaction mixture. With small amounts of hydrocarbon, the products more closely resembled the original glyceride oils. As the amount of hydrocarbon such as cyclopentadiene or its dimer was increased, the products tended to assume a resinous character but were still soluble in petroleum naphtha and in additional glyceride oil. The longer oil products containing only small amounts of hydrocarbon were suitable for use in the formulation of paints and varnishes. They could be cooked with additional gums and resins if desired and also mixed with pigments.

Such compositions were satisfactory for coating purposes and exhibited air-drying properties resembling those of tung oil. That is, they tended to air-dry substantially more rapidly than the conventional compositions formulated from linseed oil or soya bean oil. The more resinous products obtained by copolymerization of oil with larger amounts of cyclopentadiene or dicyclopentadiene could be cooked with additional glyceride oil or could be dissolved in solvents such as naphtha to provide coating compositions which were also air-drying and useful for many purposes. Very valuable products were thus produced.

The present invention contemplates an improvement upon compositions of the foregoing type to provide products having superior gloss and depth of finish and also being of relatively light color, high flexibility and excellent aging characteristics.

In accordance with the present invention, valuable products are obtained which not only contain cyclopentadiene and unsaturated glyceride oil, but also include styrene and alpha methyl styrene which are valuable components inasmuch as they often increase the viscosity of coating vehicles containing them. Also films obtained from such materials are often of improved gloss and depth and often characterized by improved flexibility, durability, and resistance to weathering.

While styrene alone as a third component in unsaturated glyceride oil cyclopentadiene copolymers often improves the properties of the resultant product as compared with a two component material, it has certain disadvantages, in that it sometimes tends to form certain amounts of polystyrene (a homopolymer) which may tend to separate as a separate phase. In accordance with the provisions of this invention, it has been discovered that the inclusion of alpha methyl styrene in the reaction mixture reduces or eliminates this tendency of polystyrene to separate as a phase.

Various techniques may be employed in forming compositions of cyclopentadiene, unsaturated glyceride oil, styrene and alpha methyl styrene. A convenient and often preferred method is to prepare preformed copolymers of cyclopentadiene and unsaturated glyceride oils. These can be formed by heating the two in appropriate amounts to polymerization temperature in an autoclave or other pressure apparatus. The mixture of styrene and alpha methyl styrene is added to the resultant two component product and the mixture is further treated to effect further reaction of the latter two components. A second method also included by the invention comprises mixing all four components (unsaturated glyceride oil, cyclopentadiene, styrene, and alpha methyl styrene) in an autoclave or other device and effecting a simultaneous reaction. Alpha methyl styrene in such mixture reduces the tendency of polystyrene to separate.

A third method also included is to copolymerize cyclopentadiene, styrene, and alpha methyl styrene and then to cook this product into unsaturated glyceride oil in a separate step.

A very good method, as previously referred to, is to form a primary resin by copolymerizing unsaturated glyceride oil and cyclopentadiene and then separately to add styrene and alpha methyl styrene. This method will be described in some detail.

THE BASE OR PRIMARY RESIN

For purposes of the present invention, a base, or primary copolymer may conveniently be prepared by conjointly polymerizing cyclopentadiene, or a lower homopolymer with any appropriate glyceride oil of unsaturated character.

Linseed oil or soya oil is the more common of the drying oils. However, the use of other unsaturated oils such as cottonseed oil, menhaden oil, peanut oil, walnut oil, sunflower oil and the like is contemplated. If desired, minor amounts, e. g. 5 to 40% of these oils may be incorporated with linseed oil or soybean oil to provide a mixture which is copolymerizable with the diene hydrocarbon. Tung oil or oiticica oil may likewise be substituted for a part, e. g. 10 to 40% of the linseed oil or soya oil.

For purposes of preparing a copolymer, cyclopentadiene, the monomer or its lower homopolymers such as dicyclopentadiene may be employed. The lower homopolymers may be regarded as the equivalents of the monomer since they tend to decompose at elevated temperatures to liberate the monomer which in turn enters into the reaction in situ with the glyceride oil to provide a copolymer essentially the same as that obtained from the use of monomeric cyclopentadiene.

PREPARATION OF PRIMARY RESIN

The preparation of a base copolymer can be conducted essentially in accordance with conventional technique. The glyceride oil such as soybean oil or linseed oil and the hydrocarbons such as cyclopentadiene or dicyclopentadiene are admixed in appropriate proportions. The oil, for example, may comprise from 45 or 50 to 70% or even more of the oil-hydrocarbon mixture. Cyclopentadiene has been found to have valuable properties in a glyceride oil even when employed in quite low proportions, e. g. 5% by weight or even less of the mixture. Drying oils containing such low proportions of cyclopentadiene body and dry substantially faster than corresponding oils containing no cyclopentadiene. The present invention includes such proportions. Such mixtures can be copolymerized by heating them to a temperature within a range of approximately 250 to 300 or 310° C. or thereabouts in an autoclave or other closed container or under a reflux condenser at atmospheric pressure.

The time required for copolymerization of these two components may vary within a range of 1 to 10 hours under pressure or 15 to 30 hours when the reaction is conducted under atmospheric pressure. The course of the reaction can be determined by observance of the tendency of the temperature to rise and finally to fall as the exothermic reaction reaches a conclusion. The pressure also tends to drop off by reason of removal of the hydrocarbon component by addition reaction with the glyceride oil component. At the conclusion of the initial copolymerization between the unsaturated glyceride oil and such cyclic diene hydrocarbon as dicyclopentadiene, a product will be attained which has a viscosity of about 50 centipoises in a mixture of 50% solids in naphtha. The viscosity can easily be determined upon tests samples drawn off from the reaction zone from time to time.

THE STYRENE MODIFICATION OF THE PRIMARY RESIN

The primary resin can be introduced into a suitable reaction container. For laboratory purposes, this may comprise a conventional chamber such as a flask provided with the necessary number of inlets. There should be an inlet for a mechanical stirrer which may be of any convenient type, another inlet for a reflux condenser and still another for the introduction of styrene or a mixture of styrene and alpha styrene. It, of course, is needless to say that the reaction container should also be equipped with temperature determining devices such as thermometers or thermocouples by means of which the course of the reaction can be observed. Heating means for the flask such as gas burners or electrical heating coils should also be provided.

The amount of styrene and alpha methyl styrene introduced into the reaction zone is variable in amount. For example, products only slightly styrene modified may be prepared or products which are very highly modified may be produced. A range of mixtures of styrene and alpha methyl styrene of 5 to 60% based upon the total mixture of primary copolymer (or mixture of oil and cyclopentadiene) and mixture of styrene and alpha methyl styrene would appear to be satisfactory.

Percentages as expressed throughout this specification, unless otherwise indicated, are by weight. In like manner proportions when expressed in parts are upon a weight basis. However, this ratio is susceptible of substantial variation. As a general rule, it is contemplated that the alpha methyl styrene may constitute from 25 to about 50% of the mixture of styrene and alpha methyl styrene introduced. However, other proportions are included by the invention. Naturally the amount of alpha methyl styrene required to inhibit the separation of polystyrene will depend upon reaction conditions in the system and the total amount of styrene available in the system. In many instances, a relatively small amount of alpha methyl styrene is sufficient. The invention includes mixtures in which the alpha methyl styrene is relatively low, e. g. 5 or 10% by weight with respect to the sum of the styrene and alpha methyl styrene. In general, any amount of alpha methyl styrene which will prevent formation of a polystyrene phase is within the scope of the invention.

A catalyst of copolymerization of the base resin and the styrene-alpha methyl styrene mixture is usually to be added but may not in all instances be required. The catalysts may conveniently be of the organic peroxide type often employed to accelerate addendum reactions of unsaturated organic compounds. These include benzoyl peroxide, tertiary butyl peroxide, tertiary butyl hydroperoxide, lauroyl peroxide, cyclohexyl hydroperoxide, acetyl peroxide and others that will accelerate addition of styrene or alphamethyl styrene and similar unsaturated compounds. The catalyst may be employed in practically any economical amount, e. g. .1 to 5% based upon the polymerizable mixture. Percents are by weight.

The copolymer product in the reaction chamber, preferably is heated initially to an appropriate reaction temperature, e. g. about 160° C. It should not be excessively high since at this stage in the reaction, high temperatures will tend unduly to volatilize the styrene/alpha methyl styrene mixture when it is added. Of course, unduly low temperatures will slow up the reaction to an objectionable extent. When the initial copolymer is at a satisfactory temperature, the mixture of styrene and alpha methyl styrene, together with the catalyst, is added slowly, e. g. at such rate as it will combine with the primary copolymer without an undue tendency of the styrene and alpha methyl styrene to volatilize or evaporate. The proper rate of addition can easily be determined by observance of any tendency of the reaction mixture to boil over or to produce vapors at such rate as to overload and escape from the reflux condenser. It will be obvious that the period required for addition of the mixture of styrene and alpha-styrene will be substantially proportional to the amount of the mixture which is added. After all of the styrene and alpha styrene have been added, the reaction is permitted to proceed for a short time or until the mixture in the vessel tends to quiet down, thus indicating that substantially all of the styrene components have been reacted.

After the styrene and alpha methyl styrene have been introduced, the temperature of the reaction mixture may be increased quite materially. It is preferably that it may be brought up to at least 200° C. and it may be substantially increased above this value. Of course, such temperatures as would produce charring or decomposition of the reaction mixture would be objectionable. Temperatures up to about 300 or 310° C. in the second stage of copolymerization are contemplated.

The time of heating of the reaction mixture after all of the styrene and alpha methyl styrene have gone into reaction with the primary resin is variable. Usually, it is desirable to heat for an hour or longer, but in some instances this period may be extended to two, three, four, five, six or even eight or ten hours. There appears to be no particular end point of heating except that, of course, as heating is prolonged the product tends to become more thick and viscous. The operation should be discontinued when the product has reached a desired degree of viscosity as can be easily determined by conventional tests. In the examples later to be given the viscosity is indicated as being G according too the Gardner-Holdt scale in a mixture comprising approximately equal portions of the copolymer product and petroleum naphtha. However, this value may be substantially lower or it may be much higher if so desired.

The following constitute specific examples illustrating the preparation of products which comprise a copolymer of a glyceride oil and dicyclopentadiene as a primary body and mixtures of styrene and alpha methyl styrene as modifying agents for this primary material.

*Example I*

A mixture of 61.5 parts of linseed oil, and 38.5 parts of dicyclopentadiene was placed in the autoclave, which was heated to 275° C. for three hours. It was then cooled to 200° C. and dropped into a metal container. This constituted the base or primary resin. The resin had a viscosity of 50 centipoises at 50% solids in petroleum naphtha (Gardner-Holdt scale).

Ninety parts of the above base or primary resin was placed in a three-necked container, which was equipped with a mechanical stirrer, a reflux condenser, a dispensing burette and a thermometer. The resin was heated to 160° C. in a period of about 30 minutes and a mixture consisting of 7 parts styrene, 3 parts alpha-methyl styrene, and 1 part benzoyl peroxide, (a catalyst), was added to the resin over a period of two hours. The temperature was maintained at 160° C. for an additional 15 minutes, after which, the temperature was raised to 230° C. in a period of three hours. It was maintained at this temperature for 4 hours to body, after which it was allowed to cool down to 180° C. It was thinned with 100 parts of petroleum naphtha to give a vehicle of "G" body (Gardner-Holdt scale) and color 11 (Gardner scale). The product with or without modification with drying oil or naphtha driers, etc. could be sprayed or brushed upon surfaces and air dried or baked to provide good films.

*Example II*

To 80 parts base or primary resin (Example I) in a flask at 160° C. was added a mixture consisting of 14 parts styrene, 6 parts alpha-methyl styrene, and 1 part benzoyl peroxide or other catalyst over a period of three hours. The temperature was raised to 230° C. in about three hours and maintained for 5½ hours. It was cooled to 180° C. and 100 parts of petroleum naphtha was added. The vehicle had a "G" body and a color 11 and would form good baking and air-drying films.

*Example III*

To 70 parts base or primary resin (Example I) in a flask at 160° C. was added a mixture consisting of 21 parts styrene, 9 parts alpha-methyl styrene and 1 part benzoyl peroxide over a period of four hours. The temperature was raised to 230° C. in about three hours and maintained for five hours. It was cooled to 180° C. and 100 parts of petroleum naphtha was added. The vehicle had a "G" body and a color 10. It was a good film forming material.

*Example IV*

A mixture of 61.5 parts of linseed oil and 38.5 parts of dicyclopentadiene was placed in the autoclave, which was heated to 275° C. for one hour. It was cooled to 200° C. and dropped into a metal container. The resultant primary or base resin had an "A-2" body at 50% solids in petroleum naphtha.

To 60 parts of the above base or primary resin in a flask at 160° C. was added a mixture consisting of 28 parts styrene, 12 parts alpha-methyl styrene and 1 part benzoyl peroxide over a period of five hours. The temperature was raised to 280° C. in about fourteen hours and maintained for two hours. It was cooled to 180° C. and 100 parts of petroleum naphtha was added. The vehicle had a "G" body. The product when spread upon wood or metal by brushing or spraying could be air dried or baked to provide films of good gloss, which were flexible and durable.

*Example V*

To 50 parts primary or base resin (Example IV) in a flask at 160° C. was added a mixture consisting of 35 parts styrene, 15 parts alpha-methyl styrene, and 1 part benzoyl peroxide or other organic peroxide catalyst over a period of six hours. The temperature was raised to 285° C. in about ten hours and maintained for two hours. It was cooled to 180° C. and 100 parts of petroleum naphtha was added. The vehicle had a "G" body. The product had good film forming properties.

*Example VI*

A mixture of 61.5 parts of soya oil and 38.5 parts of dicyclopentadiene was placed in the autoclave, which was heated to 285° C. for three hours. It was cooled to 200° C. and dropped into a metal container. The resultant primary or base resin had an "A" body at 50% solids in petroleum naphtha.

To 90 parts of the above base resin in a flask at 160° C. was added a mixture consisting of 7 parts styrene, 3 parts alpha-methyl styrene, and 1 part benzoyl peroxide or other organic peroxide over a period of two hours. The temperature was raised to 275° C. in about four hours, and maintained for three hours. It was cooled to 180° C. and 100 parts of petroleum naphtha was added. The vehicle had a "G" body and a color 15. The product had good spreading and drying properties.

*Example VII*

To 80 parts of the primary or base resin (Example VI) in a flask at 160° C. was added a mixture consisting of 14 parts styrene, 6 parts alpha-methyl styrene, and 1 part benzoyl peroxide or tertiary butyl hydroperoxide over a period of three hours. The temperature was raised to 275° C. in about nine hours, and maintained for three hours. It was cooled to 180° C. and 100 parts of petroleum naphtha was added. The vehicle had a "G" body and a color of 16. The product could be sprayed upon wood or metal and air dried or baked to provide good films.

*Example VIII*

To 70 parts of the primary of base resin (Example VI) in a flask at 160° C. was added a mixture consisting of 21 parts styrene, 9 parts alpha-methyl styrene and 1 part benzoyl peroxide over a period of four hours. The temperature was raised to 275° C. in about seven hours, and maintained for three hours. It was cooled to 180° C. and 100 parts of petroleum naphtha was added. The vehicle had a "G" body and a color of 16. It spread and dried well upon wood and metal.

*Example IX*

A mixture of 54.5 parts of soya oil and 45.5 parts of dicyclopentadiene was placed in the autoclave, which was heated to 285° C. for 2½ hours. It was then cooled to 200° C. and dropped into a metal container. The resin had an "A" body at 50% solids in petroleum naphtha.

To 80 parts of the above base resin in a flask at 160° C. was added a mixture consisting of 14 parts styrene, 6 parts alpha-methyl styrene, and 1 part benzoyl peroxide or other peroxide type catalyst over a period of three hours. The temperature was raised to 250° C. in about 2½ hours and maintained for two hours. It was cooled to 180° C. and 100 parts of petroleum naphtha was added. The vehicle had a "G" body.

*Example X*

A mixture of 80 parts of the primary or base resin (Example I), 14 parts styrene, 6 parts alpha-methyl styrene, and 1 part benzoyl peroxide was placed in the autoclave which was heated to 160° C. for two hours. The temperature was raised to 240° C. and maintained for 4 hours. It was cooled to 180° C. and 100 parts of petroleum naphtha was added. The vehicle had a "G" body.

The preparation of the styrene-alpha methyl styrene modified copolymers of drying oils and cyclopentadiene at atmospheric pressure and under a reflux condenser has been described and illustrated by way of examples. However, it is to be understood that the reaction may also be conducted in an autoclave or other suitable pressure apparatus in which the pressure can be allowed to rise. In such apparatus the temperatures of reaction may be increased and the reaction is generally speeded up so that the use of a peroxide catalyst may not necessarily be required.

In the Examples I to X the use of benzoyl peroxide as a catalyst has been described. However, it is obvious that other peroxide catalysts including lauroyl peroxide, tertiary butyl peroxide, tertiary butyl hydroperoxide, cyclohexyl hydroperoxide, acetyl peroxide and any other conventional catalyst having a capacity of accelerating the copolymerization of styrene and other unsaturated bodies by addition may be employed. In the examples the catalyst is employed in an amount of approximately 1%. However, this percentage is susceptible of variation. Amounts as low as .1% and as high as 5% are contemplated as being within the spirit of the invention.

It has been indicated that the invention includes heating a mixture of unsaturated oil such as linseed oil or soybean oil, cyclopentadiene or its equivalent of lower homopolymer (e. g. dicyclopentadiene) styrene and alpha-methyl styrene until a homogeneous body of desired viscosity is attained. In this reaction a pressure apparatus such as an autoclave preferably is employed. The autoclave should be equipped with heating means, with a temperature recording device and with a pressure gauge in order to admit of determining the course of the reaction. All reactions proceed simultaneously in the container. Pressures may be those of reaction or they may be supplemented by added hydrostatic pressures. The reactants are proportioned substantially in the manner described in connection with the reaction of styrene and alpha-methyl styrene with the preformed copolymer glyceride oil and cyclopentadiene. Such method is illustrated by the following example:

*Example XI*

Place a mixture of 61.5 parts of linseed oil, 38.5 parts of dicyclopentadiene, 7 parts styrene and 3 parts alpha-methyl styrene in an autoclave either with or without the benzoyl peroxide of Example I. Parts as above given are by weight. The temperature is raised sufficiently to effect copolymerization of the glyceride oil and cyclopentadiene as well as styrene and alpha-methyl styrene, namely, to about 280° C. for 4 to 9 hours or until a viscosity of about "G" is attained when the mixture is diluted with 50% of naphtha.

The presence of alpha-methyl styrene reduces or eliminates the tendency of polystyrene to separate out in the foregoing reaction.

The invention further includes reacting cyclopentadiene or dicyclopentadiene with styrene and alpha-methyl styrene to form a gum-like product which can then be cooked into a glyceride oil such as linseed oil or soya oil. In such technique the several constituents of the mixture may be proportioned as previously described. The preparation of a product by such technique is illustrated by the following example:

*Example XII*

Introduce into an autoclave equipped as previously described, a mixture of 14 parts styrene, 6 parts alpha-methyl styrene and 80 parts dicyclopentadiene. Parts are again by weight. The mixture is heated up to a temperature of 270° C. to 280° C. or thereabouts until the pressure generated drops off substantially and until the product assumes a solid, or at least a very viscous state when cold. Reaction should be sufficiently advanced in 2 to 4 hours.

The resin can be added to linseed oil or soya oil by cooking a mixture thereof, at 200 to 300° C. until homogeneous solution is attained. The amount of resin will depend upon the desired solids content of the resultant vehicle. It may be as low as about 5% by weight based upon the oil-resin mixture or as high as about 50% upon a like basis.

Coating compositions prepared in the manner above described, for example, any one of those prepared by the methods of Examples I to XII inclusive may be employed for coating various surfaces including ordinary wood, iron, steel, stone, brick and the like. They may be diluted with additional drying oil or with naphtha, turpentine or the like to obtain desired spreading and drying characteristics. They may also be combined with .1 to 1%, more or less, of well known drying agents employed in paints and varnishes and including glyceride oil soluble, organic salts or compounds of the drying metals including cobalt, nickel, chromium, manganese, iron and the like. Such salts would include the oleates, linoleates, naphthenates, etc. of the named metals.

The compositions, as obtained by the procedures outlined in Examples I to XII inclusive, may be admixed with coloring matters and fillers such as titanium dioxide, finely divided calcium carbonate, lamp black and many others in appropriate amounts to obtain color or opacity as may be desired.

The forms of the invention herein disclosed are given by way of example. It will be apparent to those skilled in the art that numerous modifications may be made therein without departure from the spirit of the invention or the scope of the appended claims.

This application is a continuation in part of my copending application Serial Number 66,834 filed December 22, 1948 now abandoned.

I claim:

1. In a process of preparing a coating composition the steps of heating to reaction temperatures a mixture of copolymer of an unsaturated glyceride oil and cyclopentadiene with a mixture of styrene and alphamethyl styrene in the presence of an organic peroxide catalyst.

2. A process as defined in claim 1 in which the alpha-methyl styrene constitutes 25 to 50% of the styrene-alpha methyl styrene mixture.

3. As a new product, the copolymer of a mixture of styrene alpha methyl styrene and a resin which is a copolymer of cyclopentadiene and an unsaturated glyceride oil.

4. In a process of preparing a coating composition, the steps of heating to a temperature between 200 and 310° C. inclusive, at atmospheric pressure and until copolymerization is effected, a mixture of (A) 40 to 95% by weight of a copolymer of cyclopentadiene and an unsaturated glyceride oil and (B) a blend of alpha-methyl styrene and styrene constituting the remainder of the mixture, the proportions of the constituents in the copolymer constituting component (A) being cyclopentadiene 30 to 55% by weight and unsaturated glyceride oil the remainder, the proportions of the constituents in the blend constituting component (B) being alpha-methyl styrene 25 to 50% by weight, styrene the remainder.

5. The steps as defined in claim 4 in which the reaction is effected in the presence of a peroxide catalyst of polymerization in a proportion of .1 to 5% by weight based upon the polymerizable mixture.

6. In a process of preparing a coating composition, the steps of heating to a temperature between 200 and 310° C. inclusive at atmospheric pressure and for a period of time sufficient to effect copolymerization, a copolymerizable mixture of (A) 40 to 95% by weight of a copolymer of cyclopentadiene and a glyceride oil of a class consisting of linseed oil and soya bean oil and (B) a blend of alpha-methyl styrene and styrene constituting the remainder of the mixture, component (A) being cyclopentadiene, 30 to 55% by weight and glyceride oil the remainder, the proportions of the constituents in the blend constituting component (B) being, alpha-methyl styrene 25 to 50% by weight, styrene the remainder.

7. The steps as defined in claim 6 in which copolymerization is effected in the presence of a peroxide catalyst of polymerization in a proportion of .1 to 5% by weight based upon the polymerizable mixture.

8. As a new product, a coating composition adapted to dry to form a film of high gloss, high flexibility and superior durability, said composition being a copolymer of a mixture of styrene, alpha methyl styrene and a resin which is, in turn, a copolymer of cyclopentadiene and an unsaturated glyceride oil, all components of said mixture and said resin being present in effective amounts.

9. A copolymer of (A) cyclopentadiene, (B) an unsaturated glyceride oil (C) alpha methyl styrene and (D) styrene in which the cyclopentadiene and glyceride oil together constitute 40 to 95% by weight of the total mixture of components A, B, C and D, the cyclopentadiene constitutes 30 to 55% of the combined weight of the cyclopentadiene and glyceride oil and the alpha methyl styrene constitutes 25 to 50% of the combined weight of the styrene and the alpha methyl styrene.

10. The copolymer of a mixture of (A) a copolymer of cyclopentadiene and an unsaturated glyceride oil (B) alpha methyl styrene and (C) styrene, said second mentioned copolymer constituting 40 to 95% by weight of the total mixture of components A, B and C, the rest being styrene and alpha methyl styrene, the second copolymer being 30 to 55% cyclopentadiene, the rest of the second copolymer being unsaturated glyceride oil, the alpha methyl styrene being in a proportion of 25 to 50% by weight based upon styrene and alpha methyl styrene combined.

11. As a new product a coating composition adapted to dry to form a film said composition being a homogeneous reaction product of a drying glyceride oil containing cyclopentadiene in an amount substantially to increase the rate of drying of the oil, styrene and alpha methyl styrene, the styrene and alpha methyl styrene together being present in an amount of 5 to 60% by weight of the mixture of all four components, the alpha methyl styrene being present in an amount not greater than 50% by weight of the mixture of styrene and alpha methyl styrene, but being present in such amount as will inhibit separation of polystyrene during formation of the reaction product.

References Cited in the file of this patent

UNITED STATES PATENTS

| Number | Name | Date |
|---|---|---|
| 2,601,273 | Gerhart | June 24, 1952 |